(12) United States Patent
Baird et al.

(10) Patent No.: US 8,003,270 B2
(45) Date of Patent: Aug. 23, 2011

(54) FUEL CELL STACKS AND SYSTEMS WITH FLUID-RESPONSIVE TEMPERATURE REGULATION

(75) Inventors: Bret C. Baird, Bend, OR (US); Jeffrey P. Stolasz, Bend, OR (US); Christopher J. Wright, Bend, OR (US)

(73) Assignee: Idatech, LLC, Bend, OR (US)

( * ) Notice: Subject to any disclaimer, the term of this patent is extended or adjusted under 35 U.S.C. 154(b) by 1316 days.

(21) Appl. No.: 11/301,821

(22) Filed: Dec. 12, 2005

(65) Prior Publication Data
US 2007/0042247 A1 Feb. 22, 2007

Related U.S. Application Data

(60) Provisional application No. 60/709,366, filed on Aug. 17, 2005.

(51) Int. Cl.
*H01M 8/04* (2006.01)
(52) U.S. Cl. .......................... 429/433; 429/434; 429/437
(58) Field of Classification Search .................. None
See application file for complete search history.

(56) References Cited

U.S. PATENT DOCUMENTS

| | | | |
|---|---|---|---|
| 2,824,620 A | 2/1958 | De Rosset | |
| 3,336,730 A | 8/1967 | McBride et al. | |
| 3,338,681 A | 8/1967 | Kordesch | |
| 3,350,176 A | 10/1967 | Green et al. | |
| 3,469,944 A | 9/1969 | Bocard et al. | |
| 3,522,019 A | 7/1970 | Buswell et al. | |
| 3,655,448 A | 4/1972 | Setzer | |
| 3,857,735 A | 12/1974 | Louis et al. | |
| 4,098,959 A | 7/1978 | Fanciullo | |
| 4,098,960 A | 7/1978 | Gagnon | |
| 4,175,165 A | 11/1979 | Adlhart | |
| 4,214,969 A | 7/1980 | Lawrance | |
| 4,390,602 A | 6/1983 | Struthers | |

(Continued)

FOREIGN PATENT DOCUMENTS

JP 2004-335402 11/2004

(Continued)

OTHER PUBLICATIONS

IPDL PAJ JPO machine translation for JP 2004-349248 (Iwazeki et al.), Dec. 9, 2004.*

(Continued)

*Primary Examiner* — Barbara L Gilliam
*Assistant Examiner* — Adam A Arciero
(74) *Attorney, Agent, or Firm* — Dascenzo Intellectual Property Law, P.C.

(57) ABSTRACT

Fuel cell stacks and systems with thermal management systems to deliver a liquid heat exchange fluid into thermal communication with the stack and thereafter recycle the stream. In some embodiments, the system is adapted to selectively apportion the recycled liquid stream between a stream that, prior to reuse as a heat exchange stream, is returned to a fluid reservoir and/or selectively cooled, and/or selectively returned to the reservoir and mixed with heat exchange fluid in the reservoir, and a stream that is returned into thermal communication with the stack without returning the stream to the reservoir and/or without heating or cooling and/or without being mixed with additional heat exchange fluid. In some embodiments, the system is adapted to automatically apportion the recycled stream responsive to its temperature. In some embodiments, the system includes a thermostatic valve and/or selectively apportions the recycled stream without requiring an electronic controller or manual input.

18 Claims, 5 Drawing Sheets

U.S. PATENT DOCUMENTS

| | | |
|---|---|---|
| 4,468,235 A | 8/1984 | Hill |
| 4,642,273 A | 2/1987 | Sasaki |
| 5,229,222 A | 7/1993 | Tsutsumi et al. |
| 5,366,818 A | 11/1994 | Wilkinson et al. |
| 5,366,821 A | 11/1994 | Merritt et al. |
| 5,401,589 A | 3/1995 | Palmer et al. |
| 5,432,710 A | 7/1995 | Ishimaru et al. |
| 5,527,632 A | 6/1996 | Gardner |
| 5,637,414 A | 6/1997 | Inoue et al. |
| 5,658,681 A | 8/1997 | Sato et al. |
| 5,677,073 A | 10/1997 | Kawatsu |
| 5,795,666 A | 8/1998 | Johnssen |
| 5,798,186 A | 8/1998 | Fletcher et al. |
| 5,861,137 A | 1/1999 | Edlund |
| 5,897,970 A | 4/1999 | Isomura et al. |
| 5,985,474 A | 11/1999 | Chen et al. |
| 5,997,594 A | 12/1999 | Edlund et al. |
| 6,007,931 A | 12/1999 | Fuller et al. |
| 6,083,637 A | 7/2000 | Walz et al. |
| 6,146,780 A | 11/2000 | Cisar et al. |
| 6,165,633 A | 12/2000 | Negishi |
| 6,221,117 B1 | 4/2001 | Edlund et al. |
| 6,319,306 B1 | 11/2001 | Edlund et al. |
| 6,365,289 B1 * | 4/2002 | Lee et al. ............ 429/13 |
| 6,376,113 B1 | 4/2002 | Edlund et al. |
| 6,383,670 B1 | 5/2002 | Edlund et al. |
| 6,394,207 B1 | 5/2002 | Skala |
| 6,465,118 B1 | 10/2002 | Dickman et al. |
| 6,494,937 B1 | 12/2002 | Edlund et al. |
| 6,495,277 B1 | 12/2002 | Edlund et al. |
| 6,562,111 B2 | 5/2003 | Edlund et al. |
| 6,663,993 B2 | 12/2003 | Imaseki et al. |
| 6,673,482 B2 | 1/2004 | Imazeki et al. |
| 6,835,481 B2 | 12/2004 | Dickman et al. |
| 2002/0076591 A1 | 6/2002 | Imaseki et al. |
| 2002/0127448 A1 * | 9/2002 | Derflinger et al. ............ 429/24 |
| 2003/0113601 A1 | 6/2003 | Edlund et al. |
| 2005/0084726 A1 | 4/2005 | Dickman et al. |

FOREIGN PATENT DOCUMENTS

| | | |
|---|---|---|
| JP | 2004-349248 | 12/2004 |
| WO | WO 03/049221 A2 | 6/2003 |
| WO | WO 2004/004034 A2 | 1/2004 |
| WO | WO 2005/043666 | 5/2005 |

OTHER PUBLICATIONS

English-language abstract of Japanese Patent Publication No. 2004-335402, 2004.

English-language abstract of Japanese Patent Publication No. 2004-349248, 2004.

* cited by examiner

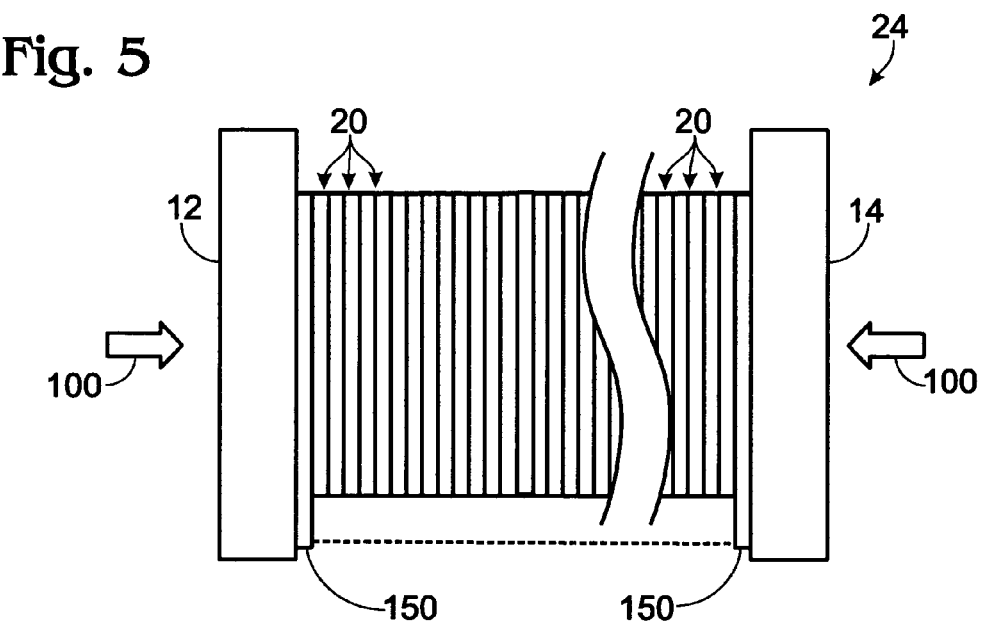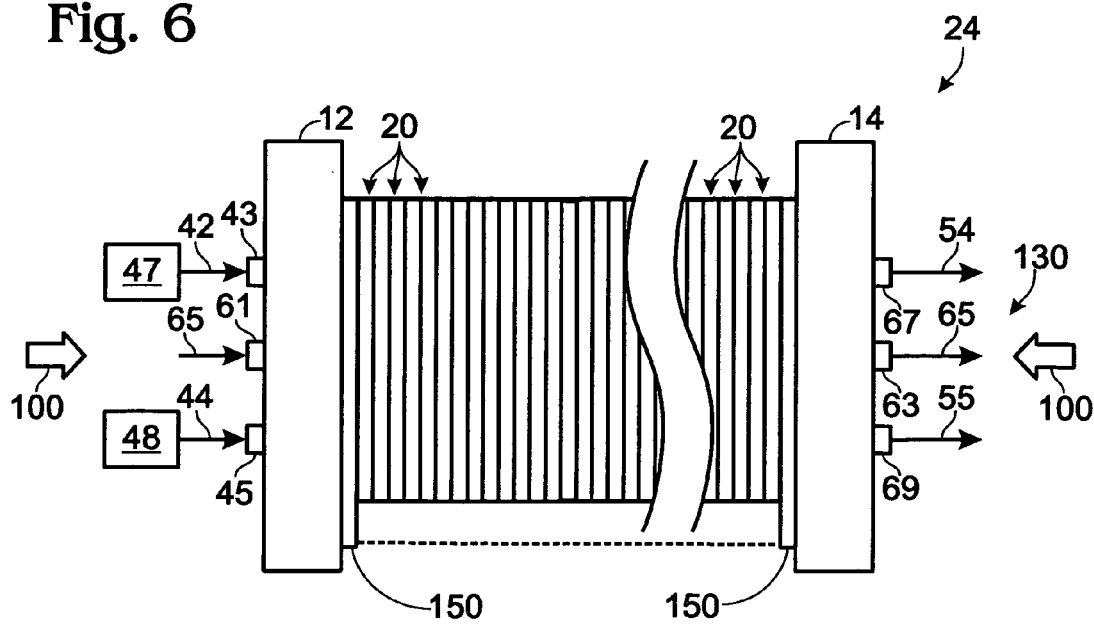

FUEL CELL STACKS AND SYSTEMS WITH FLUID-RESPONSIVE TEMPERATURE REGULATION

RELATED APPLICATION

The present application claims priority to similarly entitled U.S. Provisional Patent Application Ser. No. 60/709,366, which was filed on Aug. 17, 2005, and the complete disclosure of which is hereby incorporated by reference.

FIELD OF THE DISCLOSURE

The present disclosure is directed generally to fuel cell systems, and more particularly to thermal management systems for fuel cell stacks and systems.

BACKGROUND OF THE DISCLOSURE

Fuel cell stacks are electrochemical devices that produce water and an electric potential from a fuel, which typically is a proton source, and an oxidant. Many conventional fuel cell stacks utilize hydrogen gas as the proton source and oxygen, air, or oxygen-enriched air as the oxidant. Fuel cell stacks typically include many fuels cells that are fluidly and electrically coupled together between common end plates. Each fuel cell includes anode and cathode regions that are separated by an electrolytic membrane. Hydrogen gas is delivered to the anode region, and oxygen gas is delivered to the cathode region. Protons from the hydrogen gas are drawn through the electrolytic membrane to the anode region, where water is formed. Conventionally, the anode and cathode regions are periodically purged to remove water and accumulated gases in the regions. While protons may pass through the membranes, electrons cannot. Instead, the electrons that are liberated by the passing of the protons through the membranes travel through an external circuit to form an electric current.

A fuel cell stack is a group of fuel cells that are coupled together as a unit, typically between common end plates. The fuel cell stack receives flows of hydrogen and air from suitable sources and distributes these flows to the individual fuel cells in the stack. The fuel cell stack includes manifolds and other delivery conduits to deliver and remove fluids to and from the fuel cells within the fuel cell stack. Conventionally, a fuel cell stack includes current collectors that are adapted to be electrically connected to an external load so that power produced by the fuel cell stack may be used to satisfy the external load.

A factor that affects the performance, or efficiency, of a fuel cell stack to produce an electric current is the temperature of the stack. Accordingly, it is desirable to maintain the fuel cell stack within a range of suitable operating temperatures, such as within upper and lower threshold temperatures. During startup, the stack may not be at a temperature within this desired temperature range, and in such a situation, it is desirable to transition the stack to a temperature within this range. Accordingly, fuel cell systems typically include a temperature control system that is adapted to heat and/or cool the fuel cell stack, such as by delivering fluid streams into thermal communication with the stack to selectively heat or cool the stack.

SUMMARY OF THE DISCLOSURE

The present disclosure is directed to fuel cell stacks and systems with thermal management systems. The thermal management systems are adapted to selectively deliver a liquid heat exchange liquid into thermal communication with a fuel cell stack, such as to cool the stack. The thermal management systems thereafter are adapted to selectively recycle the heat exchange liquid through at least one heat exchange loop, or circuit, responsive at least in part, if not entirely, to the temperature of the heat exchange liquid. In some embodiments, the system includes a plurality of heat exchange loops, or circuits. In some embodiments, the thermal management system is adapted to selectively apportion the recycled heat exchange liquid stream between a stream that is returned to a heat exchange fluid reservoir prior to being selectively reused as a heat exchange stream, and a stream that is returned into thermal communication with the fuel cell stack without returning the stream to the heat exchange fluid reservoir. In some embodiments, the thermal management system is adapted to selectively apportion the recycled heat exchange liquid stream between a stream that is selectively cooled by a heat exchange assembly prior to being reused as a heat exchange stream for the fuel cell stack, and a stream that is reused as a heat exchange stream for the fuel cell stack without being cooled by the heat exchange assembly. In some embodiments, the thermal management system is adapted to selectively apportion the recycled heat exchange liquid stream between a stream that is selectively returned to a heat exchange fluid reservoir and mixed with liquid heat exchange fluid in the reservoir prior to being reused as a heat exchange fluid stream that is delivered to the fuel cell stack, and a stream that is reused as a heat exchange stream for the fuel cell stack without being returned to the heat exchange fluid reservoir and/or otherwise mixed with additional liquid heat exchange fluid. In some embodiments, the thermal management system is adapted to automatically selectively apportion the recycled heat exchange fluid stream responsive to the temperature of the recycled stream. In some embodiments, the thermal management system is adapted to selectively apportion the recycled heat exchange fluid stream without requiring an electronic controller or manual input. In some embodiments, the thermal management system includes a thermostatic valve adapted to selectively apportion the recycled heat exchange liquid stream. In some embodiments, the heat exchange fluid reservoir is selectively heated or cooled to regulate the temperature of the heat exchange liquid contained therein.

BRIEF DESCRIPTION OF THE DRAWINGS

FIG. 5 is a schematic side elevation view of a fuel cell stack that may be used with thermal management systems according to the present disclosure.

FIG. 6 is a schematic side elevation view of another fuel cell stack that may be used with thermal management systems according to the present disclosure.

DETAILED DESCRIPTION AND BEST MODE OF THE DISCLOSURE

Figure 1:
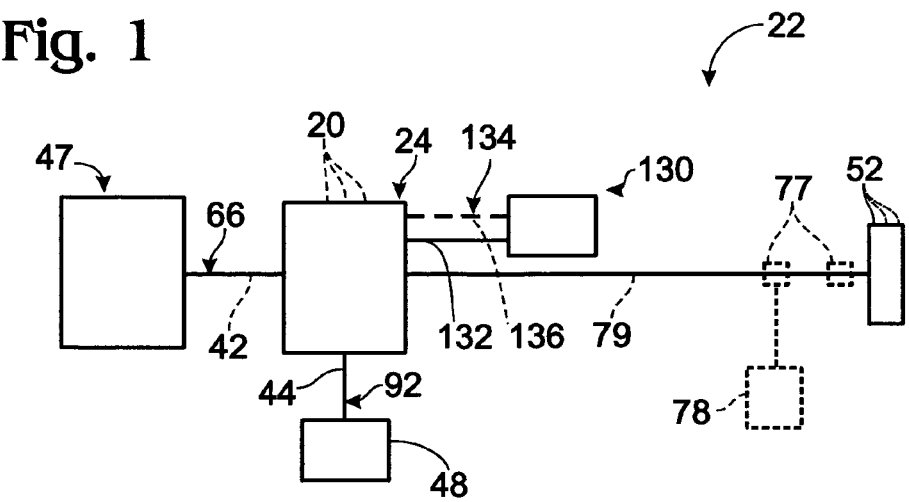
FIG. 1 is a schematic view of an illustrative fuel cell system that includes a liquid-cooled fuel cell stack and a thermal management system according to the present disclosure.

An example of a fuel cell system is schematically illustrated in FIG. 1 and generally indicated at 22. As discussed in more detail herein, system 22 includes at least one fuel cell stack 24 and a thermal management system 130 that is adapted to selectively deliver at least one liquid heat exchange stream 132 into thermal communication with the fuel cell stack to selectively heat or cool the fuel cell stack. As indicated in dashed lines in FIG. 1 and as discussed in more detail herein, thermal management system 130 may include at least one heat exchange circuit 134, such as by including at least one recycle stream 136 in which heat exchange fluid is withdrawn from thermal communication with the fuel cell stack and selectively reused in liquid heat exchange stream 132. Fuel cell stack 24 may be referred to as a liquid-cooled fuel cell stack, as it is within the scope of the present disclosure that thermal management system 130 is adapted to selectively. deliver, withdraw, and further selectively redeliver liquid heat exchange fluid streams to and from the fuel cell stack to achieve and maintain a desired operating temperature, or temperature range, within the stack.

Fuel cell stack 24 is adapted to produce an electric current from fuel 42 and oxidant 44 that are delivered to the stack. Fuel 42 is any suitable reactant, or feedstock, for producing an electric current in a fuel cell stack when the fuel and an oxidant are delivered to the anode and cathode regions, respectively, of the fuel cells in the stack. Fuel 42 may, but is not required to be, a proton source. In the following discussion, fuel 42 will be described as being hydrogen gas, and oxidant 44 will be described as being air, but it is within the scope of the present disclosure that other suitable fuels and/or oxidants may be used to produce a power output 79 in fuel cell stack 24. For example, other suitable oxidants include oxygen-enriched air streams, and streams of pure or substantially pure oxygen gas. Illustrative examples of other suitable fuels include methanol, methane, and carbon monoxide. Fuel cell system 22 may also be referred to as an energy-producing system.

As schematically illustrated in FIG. 1, system 22 includes a source, or supply, 47 of hydrogen gas (or other fuel) and an air (or other oxidant) source, or supply, 48. The sources are adapted to deliver hydrogen and air streams 66 and 92 to the fuel cell stack 24. Hydrogen 42 and oxygen 44 may be delivered to the fuel cell stack via any suitable mechanism from sources 47 and 48. Stack 24 produces from these streams a power output, which is schematically represented at 79. Also shown in dashed lines in FIG. 1 is at least one energy-consuming device 52. Device 52 graphically represents one or more device that is adapted to apply a load to the fuel cell system, with the system being adapted to satisfy this load with the power output produced by the fuel cell stack. The energy-producing system may include additional components that are not specifically illustrated in the schematic figures, such as air delivery systems, heat exchangers, sensors, controllers, flow-regulating devices, fuel and/or feedstock delivery assemblies, heating assemblies, cooling assemblies, and the like.

The at least one energy-consuming device 52 may be electrically coupled to the energy-producing system 22, such as to the fuel cell stack 24 and/or one or more optional energy-storage devices 78 associated with the stack. Device 52 applies a load to the energy-producing system 22 and draws an electric current from the system to satisfy the load. This load may be referred to as an applied load, and may include thermal and/or electrical load(s). It is within the scope of the present disclosure that the applied load may be satisfied by the fuel cell stack, the energy-storage device, or both the fuel cell stack and the energy-storage device. Illustrative examples of devices 52 include motor vehicles, recreational vehicles, boats and other sea craft, and any combination of one or more households, residences, commercial offices or buildings, neighborhoods, tools, lights and lighting assemblies, appliances, computers, industrial equipment, signaling and communications equipment, radios, electrically powered components on boats, recreational vehicles or other vehicles, battery chargers and even the balance-of-plant electrical requirements for the energy-producing system 22 of which fuel cell stack 24 forms a part.

FIG. 1 schematically depicts that energy-producing system 22 may, but is not required to, include at least one energy-storage device 78. Device 78, when included, may be adapted to store at least a portion of the electrical output, or power, 79 from the fuel cell stack 24. An illustrative example of a suitable energy-storage device 78 is a battery, but others may be used. Illustrative, non-exclusive examples of other suitable energy-storage devices that may be used in place of or combination with one or more batteries include capacitors and ultracapacitors. Energy-storage device 78 may additionally or alternatively be used to power the energy-producing system 22 during startup of the system. As indicated in dashed lines at 77 in FIG. 1, the energy-producing system may, but is not required to, include at least one power management module 77. Power management module 77 includes any suitable structure for conditioning or otherwise regulating the electricity produced by the energy-producing system, such as for delivery to energy-consuming device 52. Module 77 may include such illustrative structure as buck or boost converters, inverters, power filters, and the like.

Figure 2:
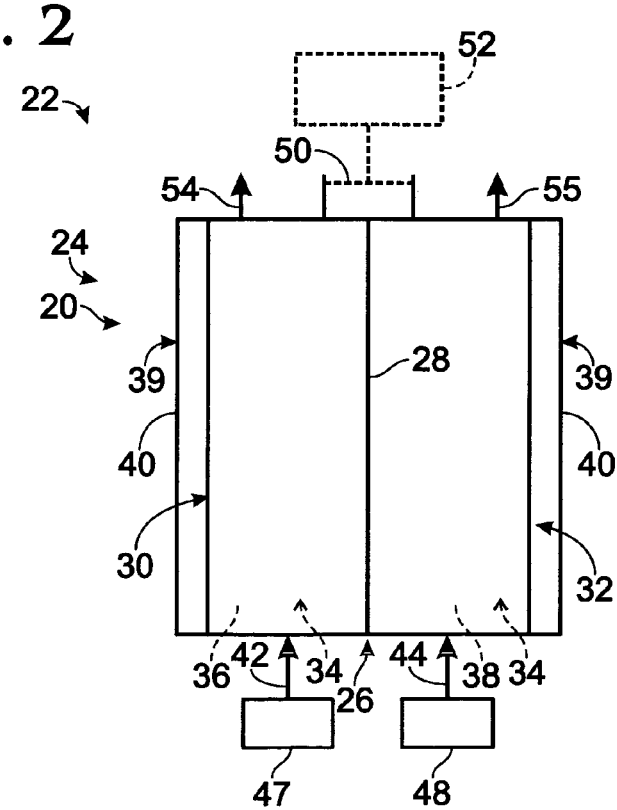
FIG. 2 is a schematic view of an illustrative fuel cell, such as may be included in liquid-cooled fuel cell stacks according to the present disclosure.

The liquid-cooled fuel cell stacks of the present disclosure may utilize any suitable type of fuel cell that is adapted to operate at temperatures less than the boiling point of water, which are referred to herein as low temperature fuel cell stacks. Illustrative examples of types of fuel cells include proton exchange membrane (PEM) fuel cells and alkaline fuel cells, and the like. The low temperature liquid fuel cell stacks with which the thermal management systems of the present disclosure are used preferably include fuel cells that receive hydrogen and oxygen as proton sources and oxidants. For the purpose of illustration, an exemplary fuel cell 20 in the form of a PEM fuel cell is schematically illustrated in FIG. 2.

Proton exchange membrane fuel cells typically utilize a membrane-electrode assembly 26 consisting of an ion exchange, or electrolytic, membrane 28 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of the bipolar plate assemblies that are discussed in more detail herein. The supporting plates 40 of fuel cells 20 carry the relative voltage potentials produced by the fuel cells.

In operation, hydrogen gas 42 from supply 47 is delivered to the anode region, and air 44 from supply 48 is delivered to the cathode region. Hydrogen 42 and oxygen 44 may be delivered to the respective regions of the fuel cell via any suitable mechanism from respective sources 47 and 48. Examples of suitable sources 47 for hydrogen 42 include a pressurized tank, metal hydride bed or other suitable hydrogen storage device that contains a supply of hydrogen gas, a chemical hydride (such as a solution of sodium borohydride), and/or a fuel processor or other hydrogen generation assembly that produces a stream containing pure or at least substantially pure hydrogen gas from at least one feedstock. Examples of suitable sources 48 of oxygen 44 include a pressurized tank of oxygen, oxygen-enriched air, or air, or a fan, compressor, blower or other device for directing air to the cathode regions of the fuel cells in the stack.

Hydrogen and oxygen typically combine with one another via an oxidation-reduction reaction. Although membrane 28 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 28 also tends not to be electrically conductive, an external circuit 50 is the lowest energy path for the remaining electron, and is schematically illustrated in FIG. 2. In cathode region 32, electrons from the external circuit and protons from the membrane combine with oxygen to produce water and heat. Thermal management systems 130 according to the present disclosure are adapted to selectively regulate this heat to maintain the fuel cell within a predetermined, or selected, operating temperature range, such as below a maximum threshold temperature, and/or above a minimum threshold temperature.

Also shown in FIG. 2 are an anode purge, or exhaust, stream 54, which may contain hydrogen gas, and a cathode air exhaust stream 55, which is typically at least partially, if not substantially, depleted of oxygen. Fuel cell stack 24 may include a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

In practice, fuel cell stack 24 will include a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device 52 and the energy-producing system 22.

Figure 3:
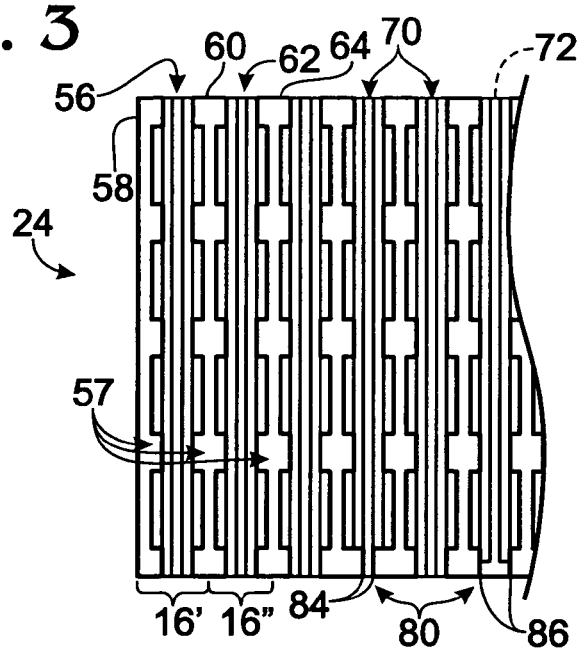
FIG. 3 is a schematic fragmentary view of a plurality of fuel cells, as may be used in fuel cell stacks according to the present disclosure.

FIG. 3 shows a schematic representation of a fragmentary portion of an illustrative fuel cell stack 24. As shown, the illustrated portion includes a plurality of fuel cells, including fuel cells 16' and 16". Fuel cell 16' includes a membrane-electrode assembly (MEA) 56 positioned between a pair of bipolar plate assemblies 57, such as assemblies 58 and 60. Similarly, fuel cell 16" includes an MEA 62 positioned between a pair of bipolar plate assemblies 57, such as bipolar plate assemblies 60 and 64. Therefore, bipolar plate assembly 60 is operatively interposed between adjacently situated MEAs 56 and 62. Additional fuel cells may be serially connected in similar fashion, wherein a bipolar plate may be operatively interposed between adjacent MEAs. The phrase "working cell" is used herein to describe fuel cells, such as cells 16' and 16", that are configured to produce electric current and typically include an MEA positioned between bipolar plate assemblies.

Figure 4:
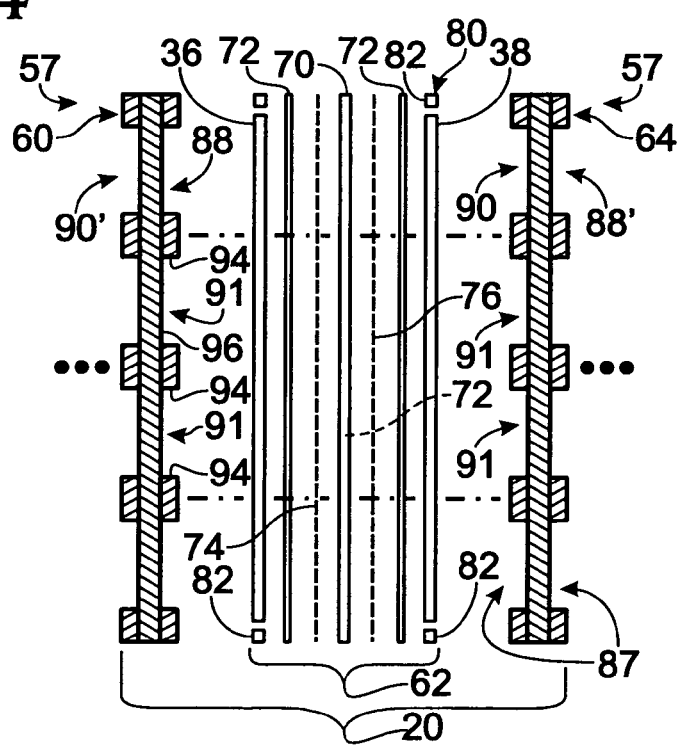
FIG. 4 is an exploded schematic view of a fuel cell, as may be used in fuel cell stacks according to the present disclosure.

FIG. 4 shows an exploded schematic view of an illustrative fuel cell, or fuel cell assembly, 20, which as discussed includes a membrane-electrode assembly (MEA) 62 positioned between bipolar plate assemblies 60 and 64. MEA 62 includes anode 36, cathode 38, and an electron barrier 70 that is positioned therebetween. Electron barrier 70 may include any suitable structure and/or composition that enables protons to pass therethrough and yet retards the passage of electrons to bias the electrons to an external circuit. As an illustrative example, barrier 70 may include a membrane-supported electrolyte that is capable of blocking electrons, while allowing protons to pass. For example, in PEM fuel cells, electron barrier 70 may be a membrane that is configured to conduct hydrogen cations (protons) and inhibit electron flow, and as such may also be described as an ion exchange membrane. In an alkaline fuel cell, electron barrier 70 may include an aqueous alkaline solution or membrane.

For at least PEM fuel cells, the electrodes, such as anode 36 and cathode 38, may be constructed of a porous, electrically conductive material such as carbon fiber paper, carbon fiber cloth, or other suitable materials. Catalysts 74 and 76 are schematically depicted as being disposed between the electrodes and the electron barrier. Such catalysts facilitate electrochemical activity and are typically embedded into barrier 70, such as into membrane 28. Cell 20 will typically also include a gas diffusion layer 72 between the electrodes and catalysts 74 and 76. For example, layer 72 may be formed on the surface of the electrodes and/or the catalysts and may be formed from a suitable gas diffusing material, such as a thin film of powdered carbon. Layer 72 is typically treated to be hydrophobic to resist the coating of the gas diffusion layers by water present in the anode and cathode regions, which may prevent gas from flowing therethrough. It should be understood that it is desirable to have a fluid seal between adjacent bipolar plate assemblies. As such, a variety of sealing materials or sealing mechanisms 80 may be used at or near the perimeters of the bipolar plate assemblies. An illustrative, non-exclusive example of a suitable sealing mechanism 80 is a gasket 82 that extends between the outer perimeters of the bipolar plate assemblies and barrier 70. Other illustrative, non-exclusive examples of suitable sealing mechanisms 80 are schematically illustrated in the lower portion of FIG. 3 and include bipolar plate assemblies with projecting flanges 84, which extend into contact with barrier 70, and/or a barrier 70 with projecting flanges 86 that extend into contact with the bipolar plate assemblies. In some embodiments, such as graphically depicted in FIG. 4, the fuel cells may include a compressible region between adjacent bipolar plate assemblies, with gaskets 82 and compressible membranes being examples of suitable compressible regions that permit the cells, and thus the stack, to be more tolerant and able to withstand external forces applied thereto.

As shown in FIG. 4, bipolar plate assemblies 60 and 64 extend along opposite sides of MEA 62 so as to provide structural support to the MEA. Such an arrangement also allows the bipolar plate assemblies to provide a current path between adjacently situated MEAs. Bipolar plate assemblies 60 and 64 are shown with flow fields 87, namely anode flow fields 88 and cathode flow fields 90. Flow field 88 is configured to transport fuel, such as hydrogen, to the anode. Similarly, flow field 90 is configured to transport oxidant, such as oxygen, to the cathode and to remove water and heat therefrom. The flow fields also provide conduits through which the exhaust or purge streams may be withdrawn from the fuel cell assemblies. The flow fields typically include one or more channels 91 that are at least partially defined by opposing sidewalls 94 and a bottom, or lower surface, 96. Flow fields 88 and 90 have been schematically illustrated in FIG. 4 and may have a variety of shapes and configurations. Similarly, the channels 91 in a given flow field may be continuous, discontinuous, or may contain a mix of continuous and discontinuous channels. Examples of a variety of flow field configurations are shown in U.S. Pat. Nos. 4,214,969, 5,300,370, and 5,879,826, the complete disclosures of which are herein incorporated by reference for all purposes.

As also shown in FIG. 4, the bipolar plate assemblies may include both anode and cathode flow fields, with the flow fields being generally opposed to each other on opposite faces of the bipolar plate assemblies. This construction enables a single bipolar plate assembly 57 to provide structural support and contain the flow fields for a pair of adjacent MEAs. For example, as illustrated in FIG. 4, bipolar plate assembly 60 includes anode flow field 88 and a cathode flow field 90', and bipolar plate assembly 64 includes cathode flow field 90 and an anode flow field 88'. Although many, if not most or even all of the bipolar plate assemblies within a stack will have the same or a similar construction and application, it is within the scope of the disclosure that not every bipolar plate assembly within stack 24 contains the same structure, supports a pair of MEAs, or contains oppositely facing flow fields.

Somewhat less schematic examples of fuel cell stacks 24 according to the present disclosure are shown in FIGS. 5 and 6. As shown, stack 24 includes a plurality of fuel cells 20 supported between end plates 12 and 14. Each cell is individually configured to convert fuel and an oxidant into an electric current. The fuel cells are electrically coupled in series, although it is within the scope of the disclosure to couple the cells in parallel or in a combination of series and parallel. When electrically coupled, the cells collectively provide an electric potential dependent on the configuration of the stack. For example, if all cells of the fuel cell stack are electrically coupled in series, the electrical potential provided by the stack is the sum of the cells' respective potentials. Therefore, if each fuel cell produces 0.6 volts, then a stack having ten cells in series would have an output of 6 volts, a stack with 50 cells would have a power output of 30 volts, a stack with 100 cells would have a power output of 60 volts, etc.

In the illustrated example shown in FIG. 6, the fuel cells of stack 24 are in fluid communication with each other, such that flows of fuel and oxidant may be delivered to the respective cells in the stack, and exhaust streams may be removed from the cells, via common delivery and exhaust manifolds. In the illustrative example shown in FIG. 6, the manifolds are shown being configured to deliver the fuel and oxidant streams 42 and 44 and to withdraw the anode and cathode exhaust streams 54 and 55 via ports associated with the end plates of the fuel cell stack. The streams of hydrogen and oxygen are received by the fuel cell stack through input ports 43 and 45. The fuel cell stack includes any suitable structure for delivering portions of these streams to the respective anode and cathode regions of fuel cells 20. Fuel cell stack 24 also includes outlet ports 67 and 69 through which the anode and cathode exhaust streams from the cells are removed from the fuel cell stack. It is within the scope of the present disclosure that other configurations and constructions may be utilized, but having the ports associated with the end plates may be desirable in many applications because of the increased thickness and stability of the end plates.

Fuel cell stacks 24 according to the present disclosure may, but are not required to, also include a humidification region in which the air or other oxidant stream for the cathode regions is humidified, such as through exposure to a water-containing stream. An illustrative, non-exclusive example of such a stream is the cathode exhaust stream from the fuel cell stack. This exchange may be accomplished by passing the streams, within or external of the fuel cell stack, through a humidification assembly that includes a humidification membrane through which water may pass from the cathode exhaust (or other water-containing) stream to the air or other oxidant stream. Any suitable humidification mechanism may be used. In some embodiments, stack 24 will include a plurality of humidification cells, or plates, in which the humidification of the air or other oxidant stream delivered to the fuel cell stack is humidified prior to being distributed to the fuel cells within the stack. It is also within the scope of the present disclosure that the oxidant stream may be sufficiently humidified prior to delivery to the fuel cell stack.

The fuel cells in fuel cell stack 24 may be supported and compressed together between the end plates by a stack compression assembly 100. Assembly 100 is adapted to draw the end plates toward each other and thereby apply compression to the fuel cells in a direction transverse to the faces, or planes, of the generally planar fuel cells. This is schematically illustrated with arrows in FIGS. 5 and 6. This compression urges the fuel cells together to maintain effective seals and electrical contacts between the components of the stack, as well as the components of the individual cells. The amount of compression to be applied may vary according to such factors as the construction of the fuel cells, including the type of gaskets used to form seals, the construction of the gas diffusion layers used in the cells, the desired operating conditions of the fuel cell stack, etc. The degree of compression, if any, required or desired for a particular fuel cell stack 24 may vary without departing from the scope of the present disclosure.

Any suitable number and type of mechanisms may be utilized to provide the desired compression to the fuel cells in stack 24. For example, the fuel cell stack may include tie rods that extend through a series of bores in the end plates to support and compress the fuel cells together between the end plates. By threading bolts or other fasteners on the ends of the tie rods, compressive forces are applied between the end plates and to the fuel cells to provide seals between the various regions of the fuel cells and the various components of the fuel cell stacks. In addition to extending through the end plates, the tie rods may also extend through portions of the individual fuel cells or around the outer perimeters of the fuel cells. Illustrative examples of fuel cell stacks utilizing compression assemblies that include tie rods are disclosed in U.S. Pat. Nos. 5,484,666 and 6,057,053, the complete disclosures of which are hereby incorporated by reference for all purposes. Additional examples of suitable compression assemblies that may, but are not required to be, used with fuel cell stacks according to the present disclosure are disclosed in U.S. Provisional Patent Applications Ser. Nos. 60/623,156 and 60/630,710, the complete disclosures of which are hereby incorporated by reference herein for all purposes. It is within the scope of the present disclosure that any suitable type and/or number of compression assemblies may be utilized.

In the illustrative example of a fuel cell stack 24 shown in FIG. 6, the stack includes at least one inlet and outlet port 61 and 63 through which liquid heat exchange fluid 65 is delivered and removed from the fuel cell stack by a thermal management system 130 according to the present disclosure to maintain the fuel cell stack at a predetermined operating temperature, or range of temperatures. The liquid heat exchange fluid may be delivered via any suitable mechanism, and at least in the context of thermal management systems 130 according to the present disclosure, will typically form a closed heat exchange assembly in which a liquid heat exchange fluid is selectively delivered in thermal communication with the fuel cells in the stack, such as to remove the heat produced during operation of the fuel cells.

In the schematic examples shown in FIG. 6, the inlet and outlet ports are respectively illustrated on end plates 12 and 14. While this construction is not required, the relative thickness and stability of the end plates makes them suitable for the inclusion of these ports. It is within the scope of the present disclosure that the ports may be formed in any suitable location on the stack. For example, the ports may all extend through the same end plate, at least one inlet port and at least one outlet port may extend through the same end plate, at least one of the ports may extend through a portion of the fuel cell stack other than the end plates, etc.

Figure 7:
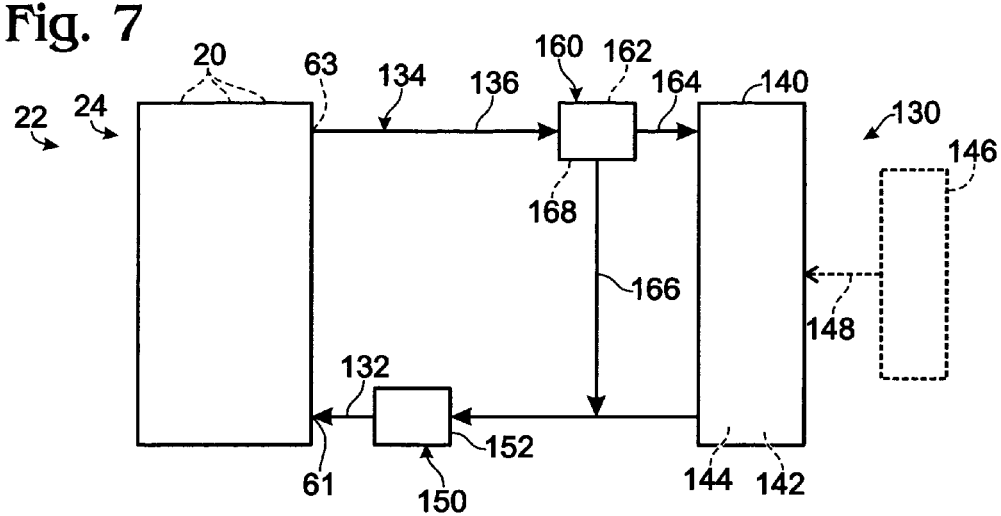
FIG. 7 is a schematic view of a fuel cell stack with an illustrative example of a thermal management system according to the present disclosure.

In FIG. 7, an example of a fuel cell stack 24 and a thermal management system 130 according to the present disclosure is schematically illustrated. Thermal management system 130 includes a liquid reservoir 140 that contains a volume of liquid heat exchange fluid 142. System 130 is adapted to selectively deliver a stream 132 of liquid heat exchange fluid 142 into thermal communication with at least the fuel cells of fuel cell stack 24. The thermal management system is further adapted to withdraw the liquid heat exchange fluid from the stack as a recycled liquid heat exchange fluid stream, or recycle stream, 136. Streams 132 and 136 form portions of heat exchange circuit 134, which may also be referred to as a liquid heat exchange fluid loop.

By "thermal communication," it is meant that the liquid heat exchange fluid is delivered sufficiently proximate the fuel cells to remove, through heat exchange, heat generated during use of the fuel cells. For example, the liquid heat exchange fluid may be delivered to one or more input ports 61 of the fuel cell stack and distributed into thermal communication with the fuel cells through any suitable distribution mechanisms, such as by distributing the fluid through cooling plates, or channels, that extend through the fuel cell stack, through coolant conduits that extend through the stack, etc. The distributed liquid heat exchange fluid may thereafter be withdrawn from the fuel cell stack, such as through one or more output ports 63.

Liquid heat exchange fluid 142, which may also be referred to as heat exchange liquid 142 and/or liquid 142, preferably is selected to be chemically and thermally stable at the operating conditions experienced during operation of the fuel cell stack, as well as at the ambient, or environmental, conditions experienced in the location where the fuel cell system is located. The heat exchange liquid may be selected so as not to change state (i.e., freeze or vaporize) when exposed to these operating and/or environmental conditions. Illustrative, non-exclusive examples of suitable liquid heat exchange fluids include water, propylene glycol, ethylene glycols, other glycols, silicone oils, other oils, mixtures containing at least one of the preceding examples, thereof, etc. As an illustrative example, the heat exchange fluid may be selected to be a liquid at temperatures above 0° C. and below 100° C., at temperatures in the range of 10° C. and 90° C., at temperatures in the range of 10° C. and 80° C., at temperatures in the range of −20° C. and 100° C., at temperatures in the range of −10° C. and 90° C., etc.

Reservoir 140 includes any suitable type and number of vessels and/or fluid conduits that are adapted to contain a volume of heat exchange fluid 142 that is not being circulated to and/or from the fuel cell stack in circuit 134. In FIG. 7, reservoir 140 is illustrated as a single vessel, but it is within the scope of the present disclosure that more than one vessel may be used, that the reservoir may include fluid conduits other than the conduits through which streams 132 and 136 flow, that the vessel may be at least partially formed from a coiled or otherwise consolidated length of fluid conduit, etc. Although not required, reservoir 140 will typically contain a volume of heat exchange fluid 142 that is at least 50% of the volume of liquid heat exchange fluid 142 present in streams 132 and 136, if not as much fluid or even more fluid than is present in these streams. For example, the reservoir may be sized to contain 100%, 200%, 300% or more of fluid 142 than may be present elsewhere in circuit 134. Reservoir 140 may, but is not required to, further include an optional mixing assembly 144 that is adapted to selectively circulate the fluid within the reservoir without requiring circulation of the fluid through heat exchange circuit 134. Illustrative examples of suitable devices for mixing assembly 144 include one or more pumps that are adapted to circulate the fluid within reservoir 140 and/or mixing vanes or other suitable mechanisms that are driven to circulate the fluid within the reservoir. Circulation of the fluid within the reservoir assists in maintaining the fluid at an equilibrium temperature and/or within a narrower temperature range than if the fluid was not circulated.

As illustrated in dashed lines in FIG. 7, reservoir 140 is preferably in thermal communication with a heat exchange assembly 146 that is adapted to selectively or continuously cool the fluid in the reservoir, such as by delivering a coolant stream 148 into thermal communication with the reservoir. For example, during use of the thermal management system at least in conditions where the fuel cell system is operating at steady state conditions, liquid heat exchange fluid 142 being returned to the reservoir in recycle stream 136 will need to be cooled before it is at a suitable temperature to be reused in stream 132 (i.e., at a sufficiently lower temperature than the fuel cells in stack 24 to be able to remove sufficient heat from the fuel cells to maintain the fuel cells below a threshold maximum operating temperature). Heat exchange assembly 146 may include any suitable type and number of mechanism (s) and/or device(s) adapted to selectively or continuously provide a coolant stream in thermal communication with the reservoir. It is within the scope of the present disclosure that the coolant stream may include an air stream, a gas stream, a liquid stream, more than one stream or type of stream, and/or may form open and/or closed heat exchange systems. For example, fans and blowers may be used to deliver air streams drawn from proximate the fuel cell system into thermal communication with the reservoir, although other mechanisms and cooling fluids may be used without departing from the scope of the present disclosure. As another example, the reservoir may be in thermal communication with fluid conduits and/or components of the fuel cell system that are at a suitable temperature, or range of temperatures, to provide the desired cooling to the reservoir.

Although described as being a coolant stream, it is within the scope of the present disclosure that in at least certain circumstances the cooling fluid may actually have a temperature that is higher than the temperature of the fluid in reservoir 140. For example, during startup of the fuel cell system in cold weather environments, it is possible for the fluid in the reservoir to initially be colder than the temperature of the coolant stream that may be selectively delivered thereto. During most operating conditions, however, the coolant fluid will have a temperature that is less than the temperature of the fluid in at least recycle stream 136, if not the temperature of the fluid in reservoir 140.

In FIG. 7, a delivery mechanism 150 is illustrated and schematically depicts any suitable mechanism(s) or device(s) that is/are adapted to propel the liquid heat exchange fluid through the heat exchange circuit. An illustrative, non-exclusive example of a suitable delivery mechanism 150 is a liquid pump 152. Illustrative types of pumps include positive displacement pumps, direct drive pumps, magnetic coupling pumps, etc. It is within the scope of the present disclosure that delivery mechanism 150 may include more than a single pump or other device adapted to selectively propel liquid heat exchange fluid 142 through the heat exchange circuit.

As also shown in FIG. 7, thermal management system 130 includes a distribution assembly 160 that contains at least one valve, or other suitable flow-regulating device, 162 that is adapted to selectively apportion, or adjust the respective percentages of, the liquid heat exchange fluid in recycle stream 136 between a stream 164 that is returned to reservoir 140 and a stream 166 that is reused as at least a portion of liquid heat exchange stream 132 without first being returned to the reservoir. Stream 164 may be described as being a portion of recycle stream 136. Distribution assembly 160 may additionally or alternatively be described as being adapted to divert at least a portion of recycle stream 136, which otherwise would be returned to reservoir 140 prior to being reused to form liquid heat exchange stream 132, to form at least a portion of stream 132 without first returning the diverted stream 166 of fluid 142 to the reservoir. Stream 166 may be referred to as a shunt stream or a direct-recycle stream because the stream is reused to form at least a portion of liquid heat exchange fluid stream 132 without being returned to the reservoir and mixed with the volume of heat exchange fluid contained therein. Similarly, the portion of the recycle stream that is diverted to shunt stream 166 will not be cooled by any heat exchange assembly 146 that is adapted to cool the liquid in the reservoir.

Distribution assembly 160 may include any suitable type and/or number of valves or other flow-regulating devices 162 that are adapted to selectively divert at least a portion of recycle stream 136 to form shunt stream 166. The selective apportionment, or division, of recycle stream 136 may vary between such illustrative configurations as a configuration in which all of the fluid in recycle stream 136 is returned to reservoir 140, a configuration in which a portion, but not all, of the fluid in recycle stream 136 is returned to the reservoir in stream 164 and a portion, but not all, of the fluid in recycle stream 136 is diverted to from shunt stream 166, and a configuration in which all of the fluid in recycle stream 136 is diverted to shunt stream 166. While within the scope of the present disclosure, it is not required that these configurations include configurations in which all of the recycle stream is diverted and/or all of the recycle stream is recycled without diversion of any portion of the stream. The portion of the recycle stream that is diverted to form shunt stream 166 therefore may vary between none and all of the recycle stream, and during use of the thermal management system may selectively form a minority of the recycle stream, a majority of the recycle stream, at least 10% of the recycle stream, at least 30% of the recycle stream, at least 50% of the recycle stream, at least 75% of the recycle stream, at least 90% of the recycle stream, etc.

Although it is within the scope of the present disclosure to include manual and/or electrically controlled valves or other flow-regulating devices 162, it is also within the scope of the present disclosure for distribution assembly 160 to utilize a valve or other flow-regulating device that is adapted to automatically apportion the liquid in recycle stream 136 between streams 164 and 166 without requiring manual or electronic inputs. An illustrative example of such a device is a thermostatic valve, as graphically indicated in FIG. 7 at 168. Thermostatic valve 168 is adapted to automatically apportion the liquid heat exchange fluid in stream 136 between streams 164 and 166 responsive at least in part to the temperature of fluid 142 in the recycle stream. Distribution assembly 160 may be referred to as a thermostatic distribution assembly in embodiments in which it includes at least one thermostatic valve or other thermostatic flow-regulating device that is adapted to selectively apportion the flow of recycle stream 136 without requiring manual or electronic inputs to the distribution assembly. For example, when the temperature of the fluid in the recycle stream is below a minimum threshold temperature, the thermostatic valve may be adapted to divert at least a majority, if not all, of the recycle stream to shunt stream 166.

As the temperature of the recycle stream increases, the thermostatic valve may be adapted to respond to this temperature change by beginning to recycle a portion of the recycle stream to the reservoir, and thereby reducing the amount of the recycle stream that is diverted to shunt stream 166, with the portion being recycled increasing as the temperature of the recycle stream continues to increase. The valve may be further configured to recycle all of the fluid in recycle stream 136 when the temperature of the fluid in recycle stream 136 reaches a selected maximum threshold temperature. The particular minimum and maximum threshold temperatures utilized by a particular thermostatic valve 168 or other valve 162 or component of distribution assembly 160 may be selected according to one or more of such illustrative factors as the heat exchange fluid being used, the type of fuel cells in the fuel cell stack, the anticipated operating temperature of the fuel cell stack, the anticipated environmental conditions expected in the location where the fuel cell stack will be used, the materials of construction of at least the distribution assembly, the volume of the heat exchange reservoir, the rate at which heat exchange fluid is circulated through circuit 134, design preferences, etc.

For example, fuel cells typically are designed to operate within a predetermined temperature range, such as between minimum and maximum temperature thresholds. Above this temperature range, the fuel cells may exhibit a decline in power output. Below this temperature range, the ionic resistance through the MEA's membrane may increase. The thresholds for a particular fuel cell may vary according to a variety of factors, such as the type of fuel cell, the materials of construction, the fuel and/or oxidant utilized in the fuel cell and the expected properties thereof, the construction of the fuel cell's membrane electrode assembly, the capacity of the fuel cell system to selectively cool the fuel cell, design preferences, etc. As an illustrative example, for PEM fuel cell stacks, thermal management system 130 may be adapted to heat the stack to a temperature of at least 40° C., or optionally of at least 50° C. Thermal management system 130 may additionally or alternatively be described as being adapted to cool the fuel cell stack to maintain the stack at an operating temperature of less than 80° C., and optionally 75° C. or less and/or 70° C. or less.

An illustrative (non-exclusive or required) example of a situation in which it may be desirable to selectively reuse at least a portion, if not all, of the recycle stream from the fuel cell stack as a heat exchange stream for the stack without first returning that portion of the liquid heat exchange fluid to the fluid reservoir is during startup of the fuel cell system in low temperature environments. Another illustrative example is when the fuel cell stack is started up or otherwise being operated at a temperature that is lower than the minimum threshold operating temperature for the fuel cells in the stack and when the heat exchange fluid in the reservoir is also below this temperature. During operation of the fuel cell stack in these illustrative examples, the liquid heat exchange fluid that is in thermal communication with the fuel cells will be heated by the fuel cells, however, it may not be heated to a temperature where it cannot be effectively directly reused as heat exchange stream 132. Therefore, directly recycling the heat exchange fluid via shunt stream 166 enables the temperature of the fuel cells to be raised to (and maintained within) the desired operating temperature range more quickly than if the recycled heat exchange fluid was returned to the reservoir and mixed with the colder heat exchange fluid contained therein.

As a comparative example, consider a situation in which the heat exchange fluid in reservoir 140 is be substantially colder, such as at least 20° C., 30° C., or more, cooler than the fuel cell stack and/or the minimum threshold temperature of the fuel cells. If this fluid is used as the fluid in heat exchange stream 132, the temperature difference between the fluid and the fuel cells may cause rapid temperature changes to the fuel cells (on at least a temporary basis). These temperature changes may negatively affect the performance of the fuel cells, such as by reducing the humidity of humidified air streams utilized by the fuel cells if the heat exchange fluid sufficiently cools the air streams to cause water to separate (condense) therefrom. The air stream may be at least partially reheated as it is delivered to the fuel cells, but it will be less humidified than prior to having water condense therefrom. Especially when this air stream now has less than a desired minimum humidity, it may dry the membrane of the fuel cell's MEA.

Continuing with the illustrative comparative examples, by initially directly recycling as stream 132 all of the heat exchange fluid withdrawn from the fuel cell stack in stream 136, this drying of the membrane during cold startup of the membrane and/or other effects of rapid temperature fluctuations within the fuel cell stack may be reduced or even eliminated. As the temperature of the fuel cell stack and heat exchange fluid being exhausted from the stack in stream 136 increases, some of the recycle stream may be permitted to return to reservoir 140. This will typically result in a portion of the (colder) heat exchange fluid within the reservoir to be emitted from the reservoir and to form (with the portion of the recycle stream in shunt stream 166) heat exchange stream 132. As a result, stream 132 will be cooler than if it was directly recycled from stream 136, the increase in temperature of the fuel cell stack will be slowed, and the temperature of the heat exchange fluid in reservoir 140 will increase. The percentage of stream 136 that is diverted to shunt stream 166 may be reduced as the temperature of the fluid within reservoir 140 and/or the temperature of the fuel cells in stack 24 increase. Eventually, all of stream 136 will be recycled through the reservoir (and thereby be in thermal communication with the heat exchange assembly that is adapted to cool the fluid in the reservoir).

Figure 8:
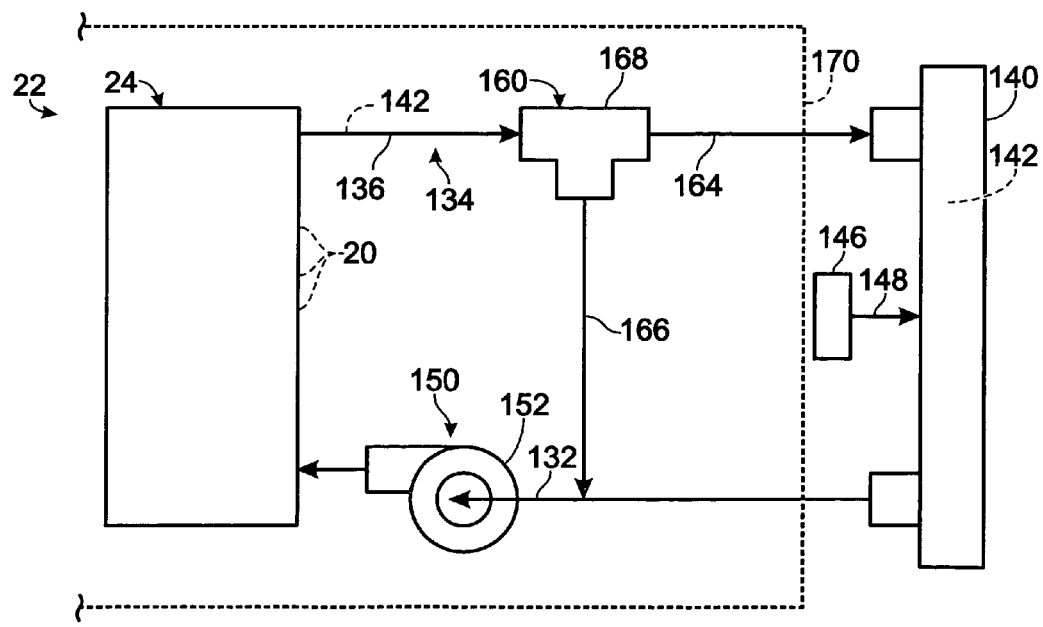
FIG. 8 is a schematic view of a fuel cell stack with another illustrative example of a thermal management system according to the present disclosure.

In FIG. 8, another illustrative example of a suitable configuration for thermal management system 130 is shown. As shown, delivery assembly 150 takes the form of a pump 152, distribution assembly 160 takes the form of a single thermostatic valve 168, and heat exchange assembly 146 takes the form of a radiator or other similar fan or blower that is adapted to deliver a coolant stream 148 in the form of an air stream in thermal communication with reservoir 140 to cool the liquid heat exchange fluid contained therein. As indicated in dashed lines in FIG. 8, reservoir 140 may be (but is not required to be) located external of a shell or other suitable housing 170 within which at least fuel cell stack 24 is located. In the illustrative example shown in FIG. 8, the fuel cell stack (and optionally other components of fuel cell system 22), thermostatic valve 168, shunt stream 166, and pump 152 are located within a common housing, while reservoir 140 and heat exchange assembly 146 are located external this housing. This selective use of a common housing for portions of the fuel cell system and/or selective positioning of portions of the thermal management system external of a housing containing at least fuel cell stack 24 is not required to all embodiments and is intended merely to indicate examples of configurations that may be implemented.

It is within the scope of the present disclosure that the selective apportionment of the fluid in recycle stream 136, such as described above with respect to valve assemblies that include a thermostatic valve 168, may be performed by one or more other suitable thermostatic flow-regulating devices 162 and/or by one or more valves or flow-regulating devices that selectively apportion the recycle stream responsive to manual and/or electronic inputs. As discussed, the selective apportionment of the recycle stream to form a shunt stream is responsive at least in part to the temperature of the liquid heat exchange fluid within the recycle stream. The temperature of the fluid in the recycle stream may be directly or indirectly detected or otherwise determined.

Figure 9:
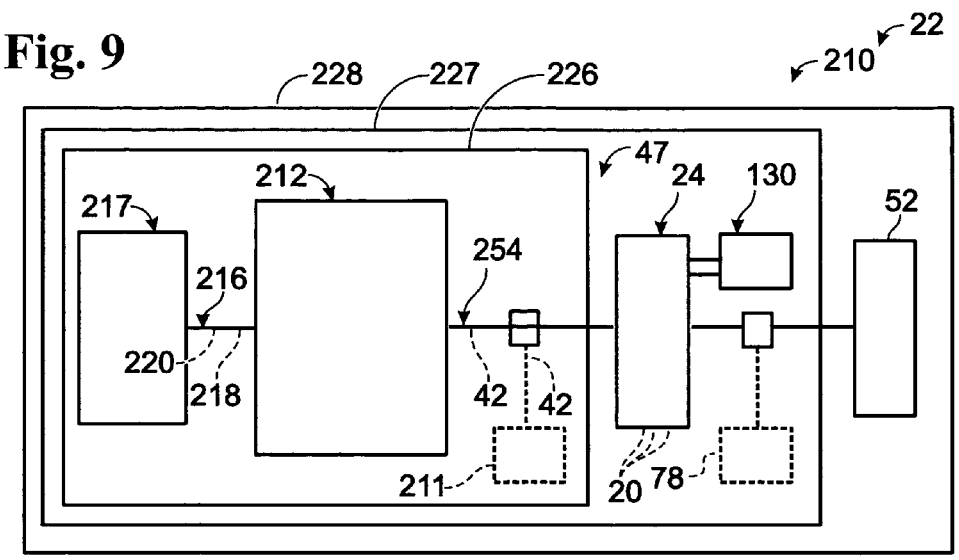
FIG. 9 is a schematic view of another illustrative fuel cell system that includes a liquid-cooled fuel cell stack and a thermal management system according to the present disclosure.

As discussed above, fuel cell stacks 24 with thermal management systems 130 according to the present disclosure may be coupled with a source 47 of hydrogen gas 42 (and related delivery systems and balance of plant components) to form a fuel cell system. A schematic example of such a fuel cell system 22 according to the present disclosure is shown in FIG. 9 and generally indicated at 210. As discussed previously with respect to FIG. 1, examples of sources 47 of hydrogen gas 42 include a storage device 211 that contains a stored supply of hydrogen gas, as indicated in dashed lines in FIG. 9. Examples of suitable storage devices 211 include pressurized tanks and hydride beds.

An additional or alternative source 47 of hydrogen gas 42 is the product stream from a fuel processor, which produces hydrogen by reacting a feed stream to produce reaction products from which the stream containing hydrogen gas 42 is formed. As shown in solid lines in FIG. 9, system 210 includes at least one fuel processor 212 and at least one fuel cell stack 24. Fuel processor 212 (and its associated feedstock delivery system, heating/cooling assembly, and the like) may be referred to as a hydrogen-generation assembly that includes at least one hydrogen-generating region. Fuel processor 212 is adapted to produce a product hydrogen stream 254 containing hydrogen gas 42 from a feed stream 216 containing at least one feedstock. One or more fuel cell stacks 24 are adapted to produce an electric current from the portion of product hydrogen stream 254 delivered thereto. In the illustrated embodiment, a single fuel processor 212 and a single fuel cell stack 24 are shown; however, it is within the scope of the disclosure that more than one of either or both of these components may be used. It should be understood that these components have been schematically illustrated and that the fuel cell system may include additional components that are not specifically illustrated in the Figures, such as air delivery systems, heat exchangers, heating assemblies, fluid conduits, and the like. As also shown, hydrogen gas may be delivered to stack 24 from one or more of fuel processor 212 and storage device 211, and hydrogen from the fuel processor may be delivered to one or more of the storage device and stack 24. Some or all of stream 254 may additionally, or alternatively, be delivered, via a suitable conduit, for use in another hydrogen-consuming process, burned for fuel or heat, or stored for later use.

Fuel processor 212 is any suitable device that produces hydrogen gas from the feed stream. Examples of suitable mechanisms for producing hydrogen gas from feed stream 216 include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol. It is within the scope of the present disclosure that the fuel processor may be adapted to produce hydrogen gas by utilizing more than a single mechanism.

Figure 10:
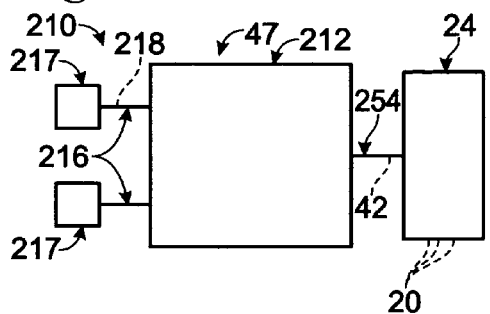
FIG. 10 is a schematic view of an illustrative hydrogen generation assembly that may be used with fuel cell systems that include a liquid-cooled fuel cell stack and a thermal management system according to the present disclosure.

Feed stream 216 may be delivered to fuel processor 212 via any suitable mechanism. Although only a single feed stream 216 is shown in FIG. 9, more than one stream 216 may be used and these streams may contain the same or different feedstocks. When carbon-containing feedstock 218 is miscible with water, the feedstock is typically, but not required to be, delivered with the water component of feed stream 216, such as shown in FIG. 9. When the carbon-containing feedstock is immiscible or only slightly miscible with water, these feedstocks are typically delivered to fuel processor 212 in separate streams, such as shown in FIG. 10. In FIGS. 9 and 10, feed stream 216 is shown being delivered to fuel processor 212 by a feedstock delivery system 217.

In many applications, it is desirable for the fuel processor to produce at least substantially pure hydrogen gas. Accordingly, the fuel processor may include one or more hydrogen producing regions that utilize a process that inherently produces sufficiently pure hydrogen gas, or the fuel processor may include suitable purification and/or separation devices that remove impurities from the hydrogen gas produced in the fuel processor. As another example, the fuel processing system or fuel cell system may include purification and/or separation devices downstream from the fuel processor. In the context of a fuel cell system, the fuel processor preferably is adapted to produced substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Suitable fuel processors are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference for all purposes.

Figure 11:
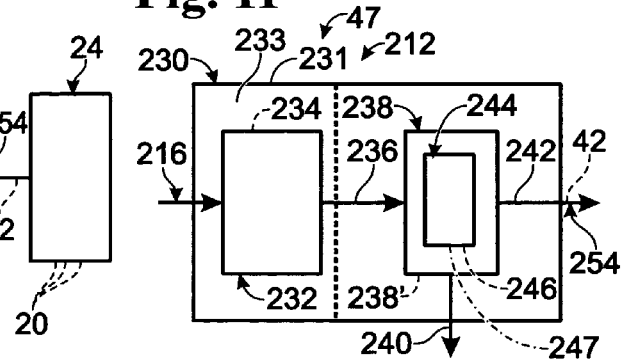
FIG. 11 is a schematic view of another illustrative hydrogen generation assembly that may be used with fuel cell systems that include a liquid-cooled fuel cell stack and a thermal management system according to the present disclosure.

For purposes of illustration, the following discussion will describe fuel processor 212 as a steam reformer adapted to receive a feed stream 216 containing a carbon-containing feedstock 218 and water 220. However, it is within the scope of the disclosure that fuel processor 212 may take other forms, as discussed above. An example of a suitable steam reformer is shown in FIG. 11 and indicated generally at 230. Reformer 230 includes a reforming, or hydrogen-producing, region 232 that includes a steam reforming catalyst 234. Alternatively, reformer 230 may be an autothermal reformer that includes an autothermal reforming catalyst. In reforming region 232, a reformate stream 236 is produced from the water and carbon-containing feedstock in feed stream 216. The reformate stream typically contains hydrogen gas and other gases. In the context of a fuel processor generally, a mixed gas stream that contains hydrogen gas as its majority component is produced from the feed stream. The mixed gas stream typically includes other gases as well. Illustrative, non-exclusive examples of these other gases, or impurities, include one or more of such illustrative impurities as carbon monoxide, carbon dioxide, water, methane, and unreacted feedstock. The mixed gas, or reformate, stream is delivered to a separation region, or purification region, 238, where the hydrogen gas is purified. In separation region 238, the hydrogen-containing stream is separated into one or more byproduct streams, which are collectively illustrated at 240 and which typically include at least a substantial portion of the other gases, and a hydrogen-rich stream 242, which contains at least substantially pure hydrogen gas. The separation region may utilize any suitable separation process, including a pressure-driven separation process. In FIG. 11, hydrogen-rich stream 242 is shown forming product hydrogen stream 254.

An example of a suitable structure for use in separation region 238 is a membrane module 244, which contains one or more hydrogen permeable membranes 246. Examples of suitable membrane modules formed from a plurality of hydrogen-selective metal membranes are disclosed in U.S. Pat. No. 6,319,306, the complete disclosure of which is hereby incorporated by reference for all purposes. In the '306 patent, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other suitable membranes and membrane modules are disclosed in the above-incorporated patents and applications, as well as U.S. patent application Ser. Nos. 10/067,275 and 10/027,509, the complete disclosures of which are hereby incorporated by reference in their entirety for all purposes. Membrane(s) 246 may also be integrated directly into the hydrogen-producing region or other portion of fuel processor 212.

The thin, planar, hydrogen-permeable membranes are preferably composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents.

Figure 12:
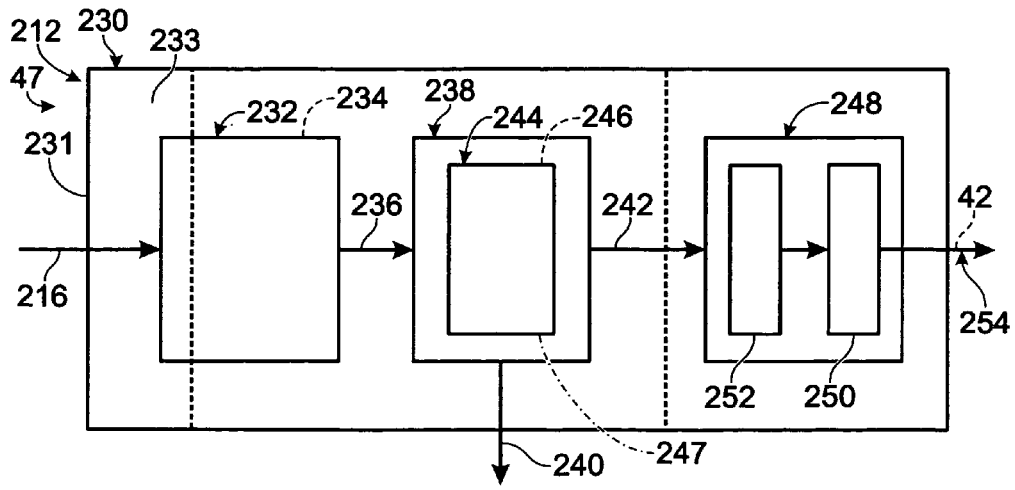
FIG. 12 is a schematic view of another illustrative hydrogen generation assembly that may be used with fuel cell systems that include a liquid-cooled fuel cell stack and a thermal management system according to the present disclosure.

Another example of a suitable pressure-separation process for use in separation region 238 is pressure swing adsorption (PSA), with a pressure swing adsorption assembly being indicated in dash-lot lines at 247 in FIGS. 11 and 12. In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 236. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are therefore removed from stream 236 along with other impurities. If the adsorbent material is going to be regenerated and these impurities are present in stream 236, separation region 238 preferably includes a suitable device that is adapted to remove these impurities prior to delivery of stream 236 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms and configurations may be used.

As discussed, it is also within the scope of the disclosure that at least some of the purification of the hydrogen gas is performed intermediate the fuel processor and the fuel cell stack. Such a construction is schematically illustrated in dashed lines in FIG. 11, in which the separation region 238' is depicted downstream from the shell 231 of the fuel processor.

Reformer 230 may, but does not necessarily, additionally or alternatively, include a polishing region 248, such as shown in FIG. 12. As shown, polishing region 248 receives hydrogen-rich stream 242 from separation region 238 and further purifies the stream by reducing the concentration of, or removing, selected compositions therein. For example, when stream 242 is intended for use in a fuel cell stack, such as stack 24, compositions that may damage the fuel cell stack, such as carbon monoxide and carbon dioxide, may be removed from the hydrogen-rich stream. The concentration of carbon monoxide should be less than 10 ppm (parts per million). Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, and even more preferably, less than 1%. Especially preferred concentrations are less than 50 ppm. It should be understood that the acceptable maximum concentrations presented herein are illustrative examples, and that concentrations other than those presented herein may be used and are within the scope of the present disclosure. For example, particular users or manufacturers may require minimum or maximum concentration levels or ranges that are different than those identified herein. Similarly, when fuel processor 212 is not used with a fuel cell stack, or when it is used with a fuel cell stack that is more tolerant of these impurities, then the product hydrogen stream may contain larger amounts of these gases.

Region 248 includes any suitable structure for removing or reducing the concentration of the selected compositions in stream 242. For example, when the product stream is intended for use in a PEM fuel cell stack or other device that will be damaged if the stream contains more than determined concentrations of carbon monoxide or carbon dioxide, it may be desirable to include at least one methanation catalyst bed 250. Bed 250 converts carbon monoxide and carbon dioxide into methane and water, both of which will not damage a PEM fuel cell stack. Polishing region 248 may also include another hydrogen-producing device 252, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 800° C., and at pressures in the range of 50 psi and 1000 psi, although temperatures and pressures outside of these ranges are within the scope of the disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing system, by the fuel cell system, by an external source, or any combination thereof.

In FIGS. 11 and 12, reformer 230 is shown including a shell 231 in which the above-described components are contained. Shell 231, which also may be referred to as a housing, enables the fuel processor, such as reformer 230, to be moved as a unit. It also protects the components of the fuel processor from damage by providing a protective enclosure and reduces the heating demand of the fuel processor because the components of the fuel processor may be heated as a unit. Shell 231 may, but does not necessarily, include insulating material 233, such as a solid insulating material, blanket insulating material, or an air-filled cavity. It is within the scope of the disclosure, however, that the reformer may be formed without a housing or shell. When reformer 230 includes insulating material 233, the insulating material may be internal the shell, external the shell, or both. When the insulating material is external a shell containing the above-described reforming, separation and/or polishing regions, the fuel processor may further include an outer cover or jacket external the insulation.

It is further within the scope of the disclosure that one or more of the components may either extend beyond the shell or be located external at least shell 231. For example, and as schematically illustrated in FIG. 12, polishing region 248 may be external shell 231 and/or a portion of reforming region 232 may extend beyond the shell. Other examples of fuel processors demonstrating these configurations are illustrated in the incorporated references and discussed in more detail herein.

Although fuel processor 212, feedstock delivery system 217, fuel cell stack 24 and energy-consuming device 52 may all be formed from one or more discrete components, it is also within the scope of the disclosure that two or more of these devices may be integrated, combined or otherwise assembled within an external housing or body. For example, a fuel processor and feedstock delivery system may be combined to provide a hydrogen-producing device with an on-board, or integrated, feedstock delivery system, such as schematically illustrated at 226 in FIG. 9. Similarly, a fuel cell stack may be added to provide an energy-generating device with an integrated feedstock delivery system, such as schematically illustrated at 227 in FIG. 9.

Fuel cell system 210 may (but is not required to) additionally be combined with one or more energy-consuming devices 52 to provide the device with an integrated, or on-board, energy source. For example, the body of such a device is schematically illustrated in FIG. 9 at 228.

INDUSTRIAL APPLICABILITY

The fuel cell stacks, systems, and thermal management systems disclosed herein are applicable to the energy-production industries, and more particularly to the fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for regulating the temperature of a fuel cell stack, the method comprising:
    pumping a stream of liquid heat exchange fluid from a liquid reservoir into thermal communication with the fuel cell stack;
    withdrawing a recycle stream of the liquid heat exchange fluid from the fuel cell stack; and
    thermostatically apportioning the recycle stream between a stream that is returned to the liquid reservoir and a bypass stream that is returned into thermal communication with the fuel cell stack without first being returned to the liquid reservoir, wherein the apportioning is responsive directly, to the temperature of the recycle stream withdrawn from the fuel cell stack, and further wherein the apportioning is not directly responsive to a temperature of the liquid heat exchange fluid that is pumped from the liquid reservoir into thermal communication with the fuel cell stack.

2. The method of claim 1, wherein the apportioning includes increasing a percentage of the recycle stream that forms the bypass stream if the temperature of the recycle stream is less than a threshold temperature.

3. The method of claim 2, wherein the threshold temperature corresponds to a minimum threshold operating temperature for the fuel cell stack.

4. The method of claim 1, wherein the apportioning includes decreasing the percentage of the recycle stream that forms the bypass stream if the temperature of the recycle stream is greater than a threshold temperature.

5. The method of claim 1, wherein the method further comprises mixing the stream that is returned to the liquid reservoir with additional liquid heat exchange fluid in the liquid reservoir.

6. The method of claim 1, wherein the method further comprises cooling the liquid heat exchange fluid in the liquid reservoir.

7. The method of claim 1, wherein the method includes automatically apportioning the recycle stream responsive to a temperature of the fuel cell stack.

8. The method of claim 1, wherein the apportioning includes decreasing a percentage of the recycle stream that forms the bypass stream if the temperature of the recycle stream is greater than a threshold temperature.

9. The method of claim 1, wherein the apportioning includes using at least one thermostatic flow-regulating device to selectively apportion the recycle stream between the stream that is returned to the liquid reservoir and the bypass stream.

10. The method of claim 9, wherein the thermostatic flow-regulating device is not electrically powered.

11. The method of claim 1, wherein the method includes maintaining, through the apportioning, an operating temperature of the fuel cell stack to be less than 80° C.

12. The method of claim 1, wherein the method includes maintaining, through the apportioning, an operating temperature of the fuel cell stack to be greater than 40° C.

13. The method of claim 12, wherein the method includes maintaining, through the apportioning, an operating temperature of the fuel cell stack to be greater than 40° C. and less than 80° C.

14. The method of claim 1, wherein the apportioning includes, during startup of the fuel cell stack, returning at least a portion of the recycle stream to the fuel cell stack as the bypass stream.

15. The method of claim 14, wherein the apportioning includes, during startup of the fuel cell stack, returning all of the recycle stream to the fuel cell stack as the bypass stream.

16. The method of claim 15, wherein the apportioning includes, during startup of the fuel cell stack, returning all of the recycle stream to the fuel cell stack as the bypass stream if the temperature of the fuel cell stack is less than a minimum threshold operating temperature of the fuel cell stack.

17. The method of claim 16, wherein the apportioning includes, during startup of the fuel cell stack, returning all of the recycle stream to the fuel cell stack as the bypass stream if the temperature of the fuel cell stack is less than a minimum threshold operating temperature of the fuel cell stack and if the temperature of the liquid heat exchange fluid in the liquid reservoir is also less than the minimum threshold operating temperature of the fuel cell stack.

18. The method of claim 1, wherein the thermostatically apportioning includes simultaneously apportioning at least a portion of the recycle stream to the liquid reservoir and at least a portion of the recycle stream to the bypass stream.

* * * * *

UNITED STATES PATENT AND TRADEMARK OFFICE
CERTIFICATE OF CORRECTION

PATENT NO. : 8,003,270 B2
APPLICATION NO. : 11/301821
DATED : August 23, 2011
INVENTOR(S) : Bret C. Baird, Jeffrey P. Stolasz and Christopher J. Wright Page 1 of 1

It is certified that error appears in the above-identified patent and that said Letters Patent is hereby corrected as shown below:

Column 20, Line 6, please delete "," between "directly" and "to".

Column 20, Line 52, please delete "C." and please insert --C-- therefor.

Signed and Sealed this
Fifteenth Day of November, 2011

David J. Kappos
*Director of the United States Patent and Trademark Office*